(12) United States Patent
Barchasz et al.

(10) Patent No.: US 9,391,310 B2
(45) Date of Patent: Jul. 12, 2016

(54) LITHIUM/SULPHUR ACCUMULATOR

(71) Applicant: Commissariat A L'Energie Atomique Et Aux Energies Alternatives, Paris (FR)

(72) Inventors: Céline Barchasz, Fontaine (FR); Sébastien Patoux, Saint Nicolas De Macherin (FR); Grégory Si Larbi, Sillans (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 35 days.

(21) Appl. No.: 14/105,739

(22) Filed: Dec. 13, 2013

(65) Prior Publication Data
US 2014/0106239 A1    Apr. 17, 2014

Related U.S. Application Data

(63) Continuation of application No. PCT/FR2012/051461, filed on Jun. 26, 2012.

(30) Foreign Application Priority Data

Jul. 5, 2011   (FR) ...................... 11 56054

(51) Int. Cl.
*H01M 2/16* (2006.01)
*B01D 69/02* (2006.01)
*H01M 4/58* (2010.01)
*H01M 10/052* (2010.01)

(52) U.S. Cl.
CPC ............... *H01M 2/162* (2013.01); *B01D 69/02* (2013.01); *H01M 2/1606* (2013.01); *H01M 4/58* (2013.01); *H01M 4/5815* (2013.01); *H01M 10/052* (2013.01); *B01D 2325/02* (2013.01); *B01D 2325/04* (2013.01); *H01M 2/1633* (2013.01); *Y02E 60/122* (2013.01)

(58) Field of Classification Search
CPC ............... B01D 69/02; B01D 2325/02; B01D 2325/04; H01M 2/1606; H01M 4/58; H01M 4/5815; H01M 10/052; H01M 2/162; H01M 2/1633
See application file for complete search history.

(56) References Cited

U.S. PATENT DOCUMENTS

| 6,183,899 B1 * | 2/2001 | Sanchez et al. ................. 429/53 |
| 2005/0042503 A1 * | 2/2005 | Kim et al. ..................... 429/137 |
| 2007/0072076 A1 * | 3/2007 | Kolosnitsyn et al. ...... 429/218.1 |
| 2012/0052397 A1 * | 3/2012 | Mikhaylik ............ H01M 2/145 429/311 |

FOREIGN PATENT DOCUMENTS

| GB | 2 424 511 A | 9/2006 |
| JP | 2003-142064 A1 | 5/2003 |
| JP | 2004-335159 A1 | 11/2004 |
| JP | 2010-199083 A1 | 9/2010 |
| WO | 2009/032313 A1 | 3/2009 |
| WO | 2009/044227 A1 | 4/2009 |

OTHER PUBLICATIONS

International Search Report (Application No. PCT/FR2012/051461) dated Aug. 30, 2012.

* cited by examiner

Primary Examiner — Muhammad Siddiquee
(74) Attorney, Agent, or Firm — Burr & Brown, PLLC

(57) ABSTRACT

The invention relates to a lithium/sulphur accumulator including at least one unit cell including: a negative electrode; an electrode separator comprising a material soaked with electrolyte, said material comprising at least one nonwoven and having a porosity in the range from 50 to 96%, and a thickness in the range from 50 to 200 micrometers; a positive electrode; and wherein said electrolyte is introduced by an excess quantity, and comprises at least one lithium salt, and the excess quantity of electrolyte amounting to from 20 to 200% of the quantity of electrolyte ensuring the wetting of the electrodes and of the separator.

13 Claims, 3 Drawing Sheets

LITHIUM/SULPHUR ACCUMULATOR

BACKGROUND OF THE INVENTION

1. Field of the Invention

The present invention relates to a lithium/sulfur accumulator comprising an electrode separator soaked with an excess quantity of electrolyte.

The invention can in particular be used in electric power storage.

2. Description of Related Art

Lithium accumulators or batteries are currently used as an autonomous power source, in particular in portable equipment. Due to their mass and volume energy density (from 160 to 240 Wh/kg; from 300 to 600 Wh/l), they tend to progressively replace nickel-cadmium (Ni—Cd) and nickel-metal hydride (Ni-MH) accumulators. Further, such systems have a lifetime capable of reaching 500, or even 1,000 cycles.

Lithium ion or Li-ion batteries have a structure containing at least one unit cell comprising two electrodes arranged on either side of a separator (organic or inorganic) soaked with an electrolyte comprising a lithium salt. The two electrodes, one positive (typically made of lithium cobalt oxide $LiCoO_2$) and the other negative (graphite), are both assembled on a metal current collector.

Much research has also been carried out on lithium/sulphur (Li/S) accumulators where the positive electrode comprises a sulphur material. The development of Li/S accumulators is particularly based on the properties of elementary sulphur, which has 2,600 Wh·kg$^{-1}$ of $Li_2S$.

Sulphur is inexpensive, naturally plentiful, and has a low environmental impact. It thus is a highly promising positive electrode material for such Li/S accumulators where lithium reacts with elemental sulphur ($S_8$) according to the following reaction:

$$16Li + S_8 \rightarrow 8Li_2S$$

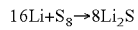

The created potential difference is approximately 2.1 V (vs. Li$^+$/Li), for a theoretical specific capacity of 1,675 mAh·g$^{-1}$ of sulphur.

However, sulphur is an insulating material generally soluble in the organic electrolytes of accumulators. Further, its dissolution may corrode the negative Li electrode and thus cause a significant self-discharge of Li/S accumulators.

Further, during the discharge of a Li/S accumulator (FIG. 1), elemental sulphur ($S_8$) is reduced by the metal lithium to form lithium polysulfide intermediate products of general formula $Li_2S_n$ (2<n<8). These more specifically are chains comprising sulphur atoms, negatively charged, associated with lithium ions, and soluble in organic electrolytes. The products present at the end of the reduction of elemental sulphur also comprise $Li_2S_2$ and $Li_2S$. Such compounds, which are little or non-soluble in the electrolyte, may precipitate at the negative electrode. Due to their electronic insulator properties, they can thus cause the passivation of the negative electrode, its electric insulation, and the end of the discharge.

Lithium polysulfide intermediate products, $Li_2S_n$, are also capable of reacting with the negative electrode (Li). They thus also promote the self-discharge. Further, they are responsible for the creation of a shuttle mechanism which occurs in charge and which adversely affects the accumulator performance, particularly in terms of coulombic efficiency. However, discharge product $Li_2S$ is non-soluble in the electrolyte and is electronically insulating. Its precipitation at the end of the discharge causes the passivation of the surface of the electrodes, which then become inactive. Thus, the capacity of a Li/S accumulator is generally in the range from 300 to 1,000 mAh·g$^{-1}$ of sulphur while the theoretical capacity is 1,675 mAh·g$^{-1}$ of sulphur.

The precipitation of the sulphur compounds depends on the nature of the electrolyte and on its quantity. Indeed, the nature of the electrolyte solvent may affect the mass storage capacity of the lithium sulphur accumulator (FIG. 2). Thus, the influence of the nature of the solvent on the electrochemical performance generally translates as a lengthening of the second discharge stage and thus an increase of the discharge capacity. This effect results from the solvation of the lithium polysulfide species. For example, solvents such as polyethylene glycol dimethyl ether (PEGDME) have a relatively long ether chain, which enables to significantly solubilize short-chain lithium polysulfides, thus limiting their precipitation.

Further, the quantity of electrolyte, and thus of solvent, to be used to prepare a lithium accumulator depends on the geometric structure thereof. Indeed, in the case of a button cell containing a single unit cell (formed of a positive sulphur electrode, of a negative metal lithium electrode, and of a single liquid organic electrolyte supported by a separator interposed between the two electrodes), an excess quantity of electrolyte is introduced. This excess quantity may be in the order of 500%, to fill empty spaces. Generally, the components have a total thickness close to 400 μm while the button cell has an approximate total thickness of 3 mm. This difference is compensated by the presence of a spring, which ensures a fine contact between all components and electrically connects the collector of the negative electrode to the upper cap. This type of accumulator thus has a significant bulk, relatively to the matter really engaged in the electrodes and the electrolyte. The excess electrolyte enables to overcome possible electrolyte losses in the dead volume, and problems of incomplete wetting of the electrodes and of the separator.

However, in the case of high-energy-density or high-voltage Li-ion accumulators, appearing in cylindrical or prismatic form or in the form of stacks of a plurality of unit cells, the quantity of electrolyte is adjusted to provide a complete wetting of the electrodes and of the separator, without for all this adding useless mass to the accumulator. Indeed, a superfluous quantity of electrolyte would not improve the accumulator performance, in terms of capacity, potential, or power response. However, it would increase the real mass of the accumulator and, for an identical electrochemical performance, would thus decrease the volume and mass storage densities. It is thus necessary to control and to optimize the quantity and the number of each component introduced in the battery. Typically, the quantity of electrolyte introduced into a Li-ion accumulator corresponds to the quantity necessary to wet the electrodes and the separators, plus approximately 10% to fill possible interstices present in the battery (other than those contained in the separator and the electrodes).

The study of button-cell type battery components involves an excess quantity of electrolyte, to fill up the dead volume of the cell. However, in the case of series cells, superfluous volumes and masses are decreased as much as possible, and the electrolyte is introduced by as limited a quantity as possible.

As already indicated, Li/S accumulators have many advantages and disadvantages, particularly as concerns the precipitation of polysulphur compounds, the electrode passivation, or the mass energy density.

Due to the dissolution of the species produced during the discharge and to their subsequent precipitation, the discharge mechanism of Li/S accumulators differs from that of conventional Li-ion technologies. The quantity and the nature of the introduced electrolyte directly affect the electrochemical performance. The conventional preparation mode of lithium batteries is thus not applicable to Li/S accumulators. A simple Li-ion accumulator separator, of microporous polyolefin separator type, filled with an excess quantity of electrolyte from 10 to 20%, is not satisfactory in the case of a Li/S system. Such very thin and moderately porous separators do not enable to receive a sufficient quantity of electrolyte for the proper operation of the redox process of Li/S accumulators.

Conventional Li-ion accumulators are generally developed in button-type cells before scaling up by transposition and adjustment of the geometry and of the components initially developed in a unit cell. However, this cannot be envisaged in the case of Li/S accumulators due to precipitation/passivation phenomena. Indeed, as illustrated in FIG. 3, a poor electrochemical performance would then be obtained for a Li/S accumulator directly transposed from a button cell architecture.

The Applicant has developed a lithium/sulphur accumulator having its electrode separator enabling to solve prior art technical problems relating to the passivation of electrodes by precipitation of the sulphur species, while maintaining a significant mass energy density.

SUMMARY OF THE INVENTION

The present invention particularly provides optimizing the electrode separator in a lithium/sulphur accumulator.

More specifically, the present invention relates to a lithium/sulphur accumulator (Li/S) comprising at least one unit cell comprising:
- a negative electrode;
- an electrode separator comprising a material soaked with an electrolyte, said material comprising at least one nonwoven and having a porosity in the range from 50 to 96%, and a thickness in the range from 50 to 200 micrometers, and more advantageously still between 50 and 100 micrometers;
- a positive electrode.

The electrode separator enables not only to provide the electric separation of the electrodes, but also to support the electrolyte of the lithium/sulphur accumulator, particularly when it is in liquid form.

Porosity means the percentage of vacuum defined by ratio (1−[(separator material volume)/(total volume)]). The separator material volume corresponds to the volume occupied by the material forming the separator material. The total volume is the volume of the separator material and the volume of the pores comprised in the separator material.

Typically, the electrode separator material has a porosity in the range from 50 to 96%. The electrode separator material has a thickness enabling to provide a good insulation of the electrodes, despite its porosity. Indeed, a very porous electrode separator may generate short-circuits.

According to an advantageous embodiment, the porosity of the separator material, and of the at least one nonwoven of the separator material, may be in the range from 50 to 90%.

However, according to a specific embodiment, the at least one nonwoven of the electrode separator material may have a thickness lower than 50 micrometers. The electrode separator material then comprises at least two nonwovens having a general porosity in the range from 50 to 96% and having a general thickness in the range from 50 to 200 micrometers. In other words, the separator material may comprise at least one nonwoven having a thickness smaller than 50 micrometers and/or a porosity smaller than 50%.

Advantageously, the electrode separator material may comprise at least one nonwoven of fibers selected from the group comprising fibers of glass, of polyethylene terephthalate (PET), of polyolefins (polypropylene (PP), polyethylene (PE)), of poly(vinyl alcohol) (PVA), of polyamide (PA), of poly(tetrafluoroethylene) (PTFE), of poly(vinyl chloride) (PVC), of polyvinylidene fluoride (PVdF). According to a specific embodiment, the nonwoven may comprise a fiber mixture.

The electrode separator material may particularly, without this being a limitation, comprise at least one nonwoven selected from the group comprising:
- a nonwoven bilayer of polyolefin/PVA nanofibers;
- a nonwoven trilayer of polyolefin/PVA nanofibers/polyolefin nonwoven;
- PVA nanofibers.

According to a specific embodiment, the electrode separator material may comprise a plurality of nonwovens, which may be identical or different. In this case, it will be within the abilities of those skilled in the art to select the adapted combinations in order to maintain a significant mass energy density.

According to the invention, the electrolyte is introduced by an excess quantity, and comprises at least one lithium salt, the excess quantity of electrolyte amounting to from 20 to 200% of the quantity of electrolyte ensuring the wetting of the electrodes and of the separator.

The quantity of electrolyte ensuring the wetting of the electrodes and of the separator corresponds to the sum of the volume of the separator pores, and of the volume of the pores of the positive and negative electrodes. This excess quantity of electrolyte thus corresponds to a volume difference with respect to the total volume of the separator pores and of the electrode pores.

The Li/S accumulator according to the present invention may appear in the form of a stack of unit cells, in cylindrical (coil) or prismatic form. It is advantageously of stacked type.

According to a specific embodiment, the electrolyte is liquid, and supported by the electrode separator. It may advantageously comprise at least one solvent which may be organic or aqueous (water).

The electrolyte further comprises at least one lithium salt which may advantageously be selected from the group comprising:
- $LiN(CF_3SO_2)_2$ (lithium bis[(trifluoromethyl)sulfonyl] imide or LiTFSI),
- $LiCF_3SO_3$ (lithium trifluoromethane sulfonate or LiTf or Li-Triflate),
- $LiClO_4$,
- $LiAsF_6$,
- $LiPF_6$,
- $LiBF_4$,
- LiI,
- $LiB(C_2O_4)_2$ (lithium bis(oxalato)borate or LiBOB),
- $LiN(CF_3CF_2SO_2)_2$ (lithium bis(perfluoroethylsulfonyl) imide or LiBETI),
- $LiNO_3$,
- LiOH (lithium hydroxide).

The lithium salt concentration of the electrolyte may advantageously be between 0.1 and 5 $mol \cdot l^{-1}$, preferably between 0.8 and 1.5 $mol \cdot l^{-1}$.

The lithium salt is advantageously soluble in the solvent or in the mixture of solvents of the electrolyte. In the case of an aqueous electrolyte, salts of $LiNO_3$ and LiOH type are dissolved in water.

The solvent of the organic electrolyte may advantageously be selected from the group comprising:
- carbonates such as PC (propylene carbonate), DMC (dimethyl carbonate), EC (ethylene carbonate), DEC (diethyl carbonate);
- ethers such as DIOX (1,3-dioxolane), THF (tetrahydrofurane), DME dimethoxyethane), or more generally the family of glymes of formula $CH_3O—(CH_2CH_2O)_n—CH_3$ (n=1-10), such as polyethylene glycol dimethyl ether (PEGDME).

The electrolyte may also comprise at least one additive which may be a passivating or safety additive such as $LiNO_3$, by from 5 to 10% by volume, having the function of protecting a metal Li electrode.

To obtain an optimal mass energy density, while taking into account the requirements of a Li/S accumulator, a porous separator should be combined with an excess quantity of electrolyte. While the excess electrolyte is added in controlled fashion, the separator should also have a specific porosity, while being as light as possible. The porosity of the separator thus enables its soaking with excess electrolyte, up to from 20 to 200% of excess electrolyte, preferably between 50 and 100% of excess electrolyte with respect to the quantity of electrolyte ensuring the wetting of the electrodes and of the separator.

The excess quantity of electrolyte is determined according to the quantity necessary to wet the electrodes and the separator. It will thus be within the abilities of those skilled in the art to adjust the quantity of electrolyte according to the separator and to the electrode surface area, particularly to avoid excessively decreasing the mass and volume storage densities of the accumulator.

In the Li/S accumulator according to the present invention, the positive electrode is advantageously made of at least one active electrode sulphur material selected from the group comprising elemental sulphur; lithium sulfide ($Li_2S$); lithium polysulfides of general formula $Li_2S_n$, n being in the range from 2 to 8; organic polysulfides of general formula $R_2S_n$ (R being a linear alkyl chain capable of comprising from 2 to 10 carbon atoms, and n being in the range from 2 to 50); organosulphur compounds of the type poly(carbon disulfide $(C_2S_x)_n$ with x being in the range from 2.5 to 50, and n being greater than or equal to 2; as well as any disulfide polymer having a chaining of S—S bonds capable of being broken during the discharge cycle of the Li/S accumulator and formed back during the charge cycle.

Further, the positive electrode is advantageously deposited on a current collector selected according to the stability of the active positive electrode material. The current collector of the positive electrode may particularly be a foil of copper or copper alloys, of aluminum or of aluminum alloys, of nickel, of stainless steel.

Typically, the current collector of the positive electrode is formed of an aluminum foil having a 20-micrometer thickness.

Preferably, the positive electrode is made of elemental sulphur, giving the Li/S accumulator a greater energy density, due to its large mass storage capacity. Further, to improve its electronic conductivity, the positive electrode may comprise an electronically-conductive additive, such as carbon black, carbon nanotubes or fibers, metal particles, or conductive polymer.

Further, the negative electrode may advantageously be made of at least one active electrode material selected from the group comprising:

metal lithium;
metal lithium alloys such as LiAl;
lithium insertion compounds, such as graphite.

According to a specific embodiment, it may also be made of alloys containing tin or silicon.

The current collector of the negative electrode is selected according to the stability of the active negative electrode material. It may particularly be selected from the group comprising foils of copper or of copper alloys, of aluminum or of aluminum alloys, of nickel, or of stainless steel.

Typically, it is made of a copper foil having a 10-micrometer thickness. Preferably, the negative electrode is made of metal lithium, giving the Li/S accumulator a significant energy density, due to its large mass storage capacity.

It will be within the abilities of those skilled in the art to adapt the aqueous or organic nature of the electrolyte also according to the electrode. Indeed, it goes without saying that an aqueous electrolyte is not compatible with a negative metal lithium electrode.

According to a preferred embodiment, the Li/S accumulator of the present invention may comprise at least one unit cell, comprising:
- a negative metal lithium electrode deposited on a copper foil;
- a nonwoven electrode separator having a porosity in the range from 50 to 96%, soaked with an excess quantity of electrolyte in the range between 30 and 100%;
- a positive electrode made of elemental sulphur, deposited on an aluminum foil;
- the electrolyte comprising LiTFSI dissolved in a 50/50 mixture of PEGDME/DIOX.

Generally, the Li/S accumulator according to the present invention may be used in the context of electric power storage.

The invention and the resulting advantages will better appear from the following non-limiting drawings and examples, provided as an illustration of the invention.

DETAILED DESCRIPTION OF THE INVENTION

The examples discussed hereafter concern the forming of Li/S accumulators of "stacked" type, by stacking of unit cells comprising:
- an electrode;
- an electrode separator soaked with an electrolyte comprising a lithium salt;
- a positive electrode.

Each of the accumulators comprises ten cells formed by the stacking of a total number of five positive two-sided electrodes, ten separators, and six negative electrodes (four being two-sided and two being one-sided).

Negative Electrode

The negative electrode of these unit cells is made of lithium. It has a 140-micrometer thickness and a square shape of dimensions 4.15 cm*4.15 cm. A copper tab having a 10-micrometer thickness, used to collect the current, is further attached to the negative electrode.

Positive Electrode

The two-sided positive electrode of these unit cells is formed from an ink made of (by mass):
- 75% of sulphur as an active material (Refined® elemental sulphur commercialized by Aldrich);
- 10% of carbon black (Super P® commercialized by Timcal);
- 5% of carbon fibers (VGCF® commercialized by Showa Denko);
- 10% of binding agent (polyvinylidene difluoride PVdF commercialized by Solvay) dissolved in N-methylpyrrolidone (NMP).

The quantity of NMP is adjusted to reach the optimal viscosity allowing an easy deposition of the mixture with a mass excess of from 100 to 500% of the introduced solid material. The ink is deposited by microscale coating by means of a doctor blade (deposition of a 500-micrometer thickness) on an aluminum foil having a 20-micrometer thickness. The coating is then dried at 55° C. for 24 hours under air. The ink is then deposited back on the other side of the aluminum foil (500-micrometer deposition). The new coating is also dried at 55° C. for 24 hours under air. The two-sided electrode is then sawn into squares having 4 cm*4 cm dimensions. An aluminum current collection tab is also used as a supplement, to collect the current of each positive electrode. It is a two-sided collector for two electrodes.

Separator

The Li/S accumulators of examples 1, 2, and of the comparative example discussed hereafter, can be distinguished from one another due to the nature of the electrode separator.

The following materials are used to prepare the current separators:
- VILEDON® type FS 2206-14 (commercialized by Freudenberg) having a 55% porosity;
- Celgard®2325 (commercialized by Celgard): polyolefin nonwoven (of poly-propylene or PP type) having a 140-micrometer thickness and a 39% porosity;
- BERNARD DUMAS®, type 1C1755 (commercialized by Bernard Dumas): glass fiber nonwoven, reinforced by polyethylene terephthalate) (PET) fibers which provide a good mechanical behavior of the membrane, while allowing a very high porosity. The thickness of this type of separator generally is 80 micrometers for a 90% porosity.

Example 1

Figure 1:
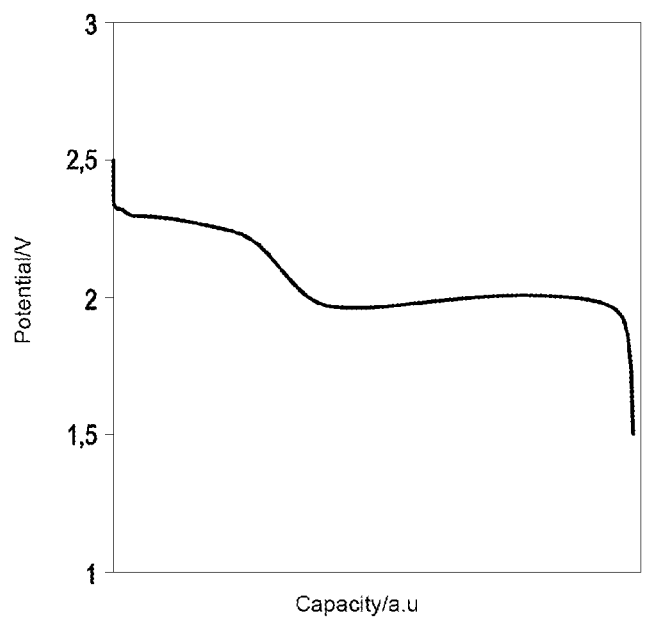
FIG. 1 illustrates the discharge curve of a conventional lithium/sulphur accumulator.
Figure 2:
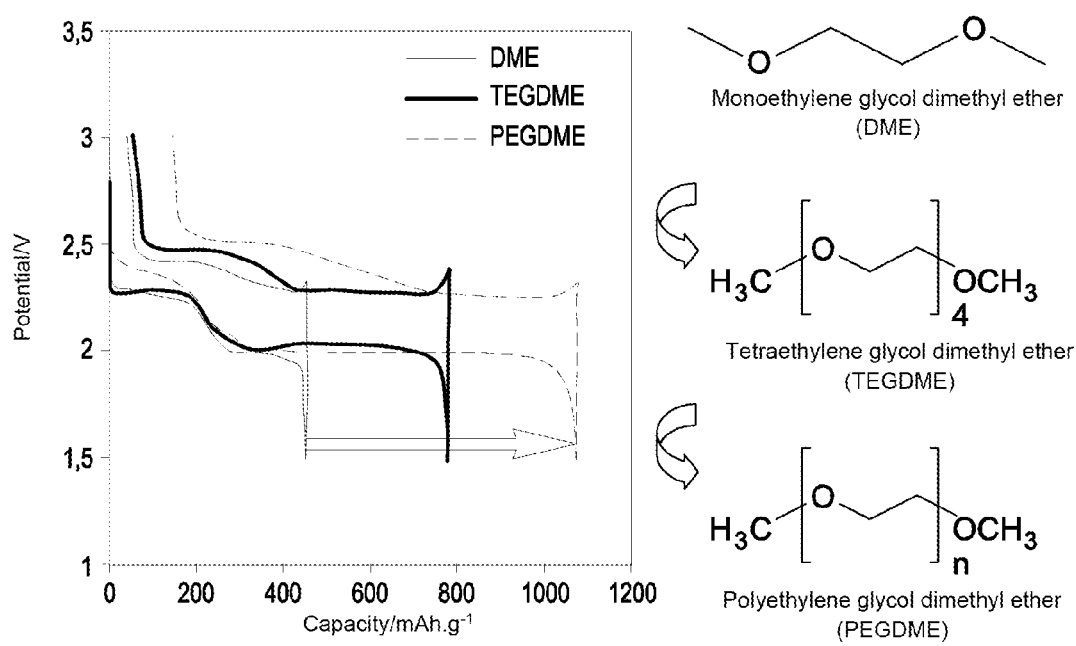
FIG. 2 shows the graph corresponding to the mass storage capacity of a prior art lithium/sulphur accumulator, according to the nature of the electrolyte solvent.
Figure 3:
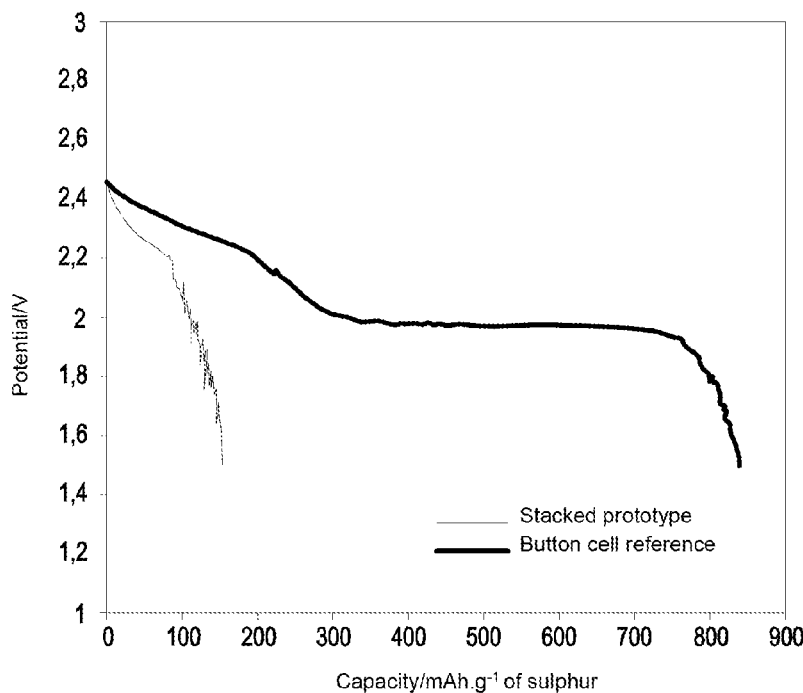
FIG. 3 illustrates the electrochemical performance, in terms of mass storage capacity, of a stacked Li/S accumulator and of a Li/S button cell, formed according to the same prior art embodiment.
Figure 4:
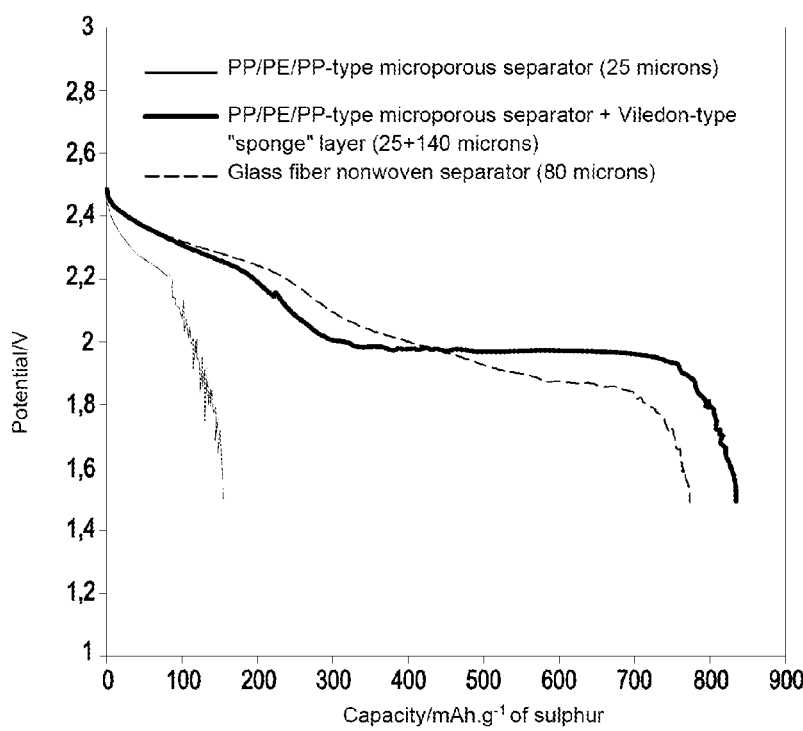
FIG. 4 shows the mass storage capacity of two accumulators according to the invention and of a conventional accumulator according to the potential.
Figure 5:
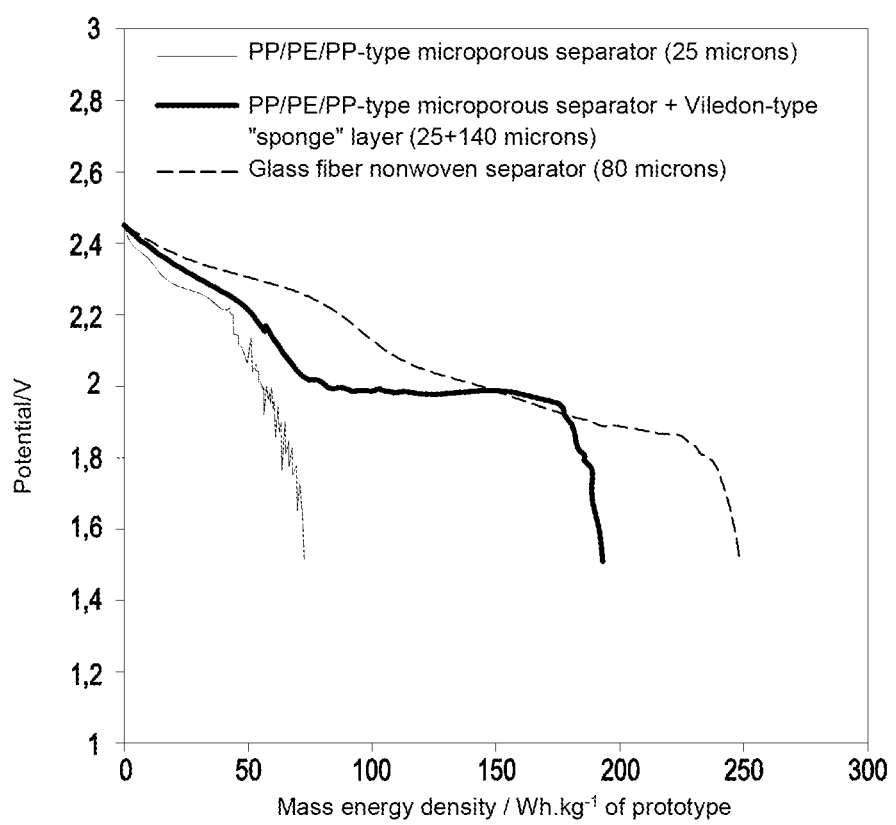
FIG. 5 shows the mass energy density of two accumulators according to the invention and of a conventional accumulator according to the potential.

Invention, FIGS. 4 and 5

The separator is a Celgard® 2325 (PP/PE/PP) nonwoven, coupled with a polyolefin nonwoven, Viledon® (PP having a 140-μm thickness), soaked with a liquid electrolyte containing LiTFSI salt (1 mol·L$^{-1}$) dissolved in a 50/50 mixture by volume of PEGDME/DIOX (excess: 30%).

PP=polypropylene
PE=polyethylene
PEGDME=polyethylene glycol dimethyl ether
DIOX=1,3-dioxane
LiTFSI=LiN(CF$_3$SO$_2$)$_2$ (lithium bis[(trifluoromethyl)sulfonyl]imide),

Example 2

Invention, FIGS. 4 and 5

The separator is a glass fiber nonwoven (Bernard Dumas®, type 1C1755), soaked with a liquid electrolyte containing LiTFSI salt (1 mol·L$^{-1}$) in solution in a 50/50 mixture by volume of PEGDME/DIOX (excess: 30%).

Comparative Example (FIGS. 4 and 5) (Prior Art)

The separator is a Celgard® 2325 nonwoven, soaked with a liquid electrolyte containing LiTFSI salt (1 mol·L$^{-1}$) in solution in a 50/50 mixture by volume of PEGDME/DIOX (excess: 30%).

Electrochemical Performance Of Accumulators According to the Present Invention

The accumulators of examples 1 and 2 each have a mass storage capacity (expressed according to the quantity of sulphur comprised in the electrolyte, mAh per gram of sulphur) greater than that of an accumulator according to prior art (comparative example) having its electrode separator formed of a polyolefin nonwoven having a 39% porosity (FIG. 4).

Indeed, the storage capacity corresponding to the accumulator of example 1 (separator combining a polyolefin nonwoven of 55% porosity and polyolefin nonwoven of 39% porosity) is close to 850 mAh·g$^{-1}$ while that corresponding to the comparative example is 170 mAh·g$^{-1}$ only. It should also be noted that the storage capacity of the accumulator of example 2 (separator made of glass fiber nonwoven having a 90% porosity) is close to 800 mAh per gram of sulphur.

As concerns the mass energy density, expressed in Wh per kilogram of stacked unit cells, the accumulator according to

TABLE 1

Composition of the accumulator separator and electrolyte

| | Separator | | | Electrolyte[a] | |
|---|---|---|---|---|---|
| Example | Composition | Thickness (μm) | Porosity | Solvent | Lithium salt (Excess) |
| 1 | Celgard ®2325 | 25 | 39% | PEGDME/DIOX (50/50) | LiTFSI (30%) |
|  | Viledon ® | 140 | 55% |  |  |
| 2 | Bernard Dumas ® | 80 | 90% | PEGDME/DIOX (50/50) | LiTFSI (30%) |
| Comparative example | Celgard ®2325 | 25 | 39% | PEGDME/DIOX (50/50) | LiTFSI (30%) |

[a]lithium salt (1 mol/L) dissolved in a solvent mixture (PEGDME/DIOX)

example 2 has better results than that of example 1, given that the separator of example 2, made of a glass fiber nonwoven having a 80-micrometer thickness, is lighter than the separator of example 1.

Thus, the mass energy density obtained for the accumulators of examples 1 and 2 are respectively in the range from 200 to 250 Wh·kg$^{-1}$.

These values are much higher than the mass density of the accumulator according to the comparative example, 75 Wh·kg$^{-1}$.

The use of an electrode separator comprising a porous nonwoven enables to improve not only the mass storage capacity of the accumulator, but also its mass energy density.

Further, the use of an excess quantity of electrolyte provides a greater dissolution of the sulphur species at the end of the discharge cycle than with prior art separators. Their precipitation is thus delayed, as well as the passivation of the positive electrode. The storage capacity per gram of sulphur can thus be greatly increased.

The invention claimed is:

1. A lithium/sulphur accumulator comprising at least one unit cell comprising:
   a negative electrode;
   an electrode separator comprising a material soaked with electrolyte, said material comprising at least one nonwoven and having a porosity in a range of 50 to 96%, and a thickness in the range of 50 to 200 micrometers;
   a positive electrode;
   wherein said electrolyte is present in an excess quantity, and comprises at least one lithium salt, and the excess quantity of electrolyte is in a range of 20 to 200% of the quantity of electrolyte, ensuring the wetting of the electrodes and of the separator; and
   wherein the electrolyte is liquid and is supported by the electrode separator.

2. The lithium/sulphur accumulator of claim 1, wherein the positive electrode is made of at least one sulphur material selected from the group consisting of elemental sulphur, lithium sulfide (Li$_2$S), lithium polysulfides of a general formula Li$_2$S$_n$, wherein n is in a range of 2 to 8, organic polysulfides having a general formula of R$_2$S$_n$, wherein R is a linear alkyl chain capable of comprising 2 to 10 carbon atoms and n is in a range of 2 to 50, organosulphur compounds of a poly(carbon disulfide) type, and a disulfide polymer having a chaining of S—S bonds capable of being broken during the discharge cycle of the Li/S accumulator and formed back during the charge cycle.

3. The lithium/sulphur accumulator of claim 1, wherein the negative electrode comprises at least one active material selected from the group consisting of metal lithium, metal lithium alloys, and lithium insertion compounds.

4. The lithium/sulphur accumulator of claim 1, wherein the lithium salt of the electrolyte is selected from the group consisting of LiN(CF$_3$SO$_2$)$_2$, LiCF$_3$SO$_3$, LiClO$_4$, LiAsF$_6$, LiPF$_6$, LiBF$_4$, LiI, LiB(C$_2$O$_4$)$_2$, LiN(CF$_3$CF$_2$SO$_2$)$_2$, LiNO$_3$, and LiOH.

5. The lithium/sulphur accumulator of claim 1, wherein the excess quantity of electrolyte is in a range of 50 to 100% of the quantity of electrolyte, ensuring the wetting of the electrodes and of the separator.

6. The lithium/sulphur accumulator of claim 1, wherein the electrolyte comprises at least one solvent selected from the group consisting of carbonates, ethers and water.

7. The lithium/sulphur accumulator of claim 1, wherein the material has a porosity in a range of 50 to 90%.

8. The lithium/sulphur accumulator of claim 1, wherein the material has a thickness in a range of 50 to 100 micrometers.

9. The lithium/sulphur accumulator of claim 1, wherein the nonwoven comprises fibers selected from the group consisting of glass fibers, poly(ethylene terephthalate) fibers, polyolefin fibers, poly(vinyl alcohol) fibers, polyamide fibers, poly(tetrafluoroethylene) fibers, poly(vinyl chloride) fibers, polyvinylidene fluoride fibers and mixtures thereof.

10. The lithium/sulphur accumulator of claim 9, wherein the polyolefin fibers are one of polypropylene fibers and polyethylene fibers.

11. The lithium/sulphur accumulator of claim 6, wherein the carbonate of the solvent comprises one of propylene carbonate, dimethyl carbonate, ethylene carbonate and diethyl carbonate.

12. The lithium/sulphur accumulator of claim 6, wherein the ether of the solvent comprises one of 1,3-dioxolane, tetrahydrofurane, 1,2-dimethoxyethane and the family of glymes having a formula of CH$_3$O—(CH$_2$CH$_2$O)$_n$—CH$_3$, wherein n is in a range of 1 to 10.

13. The lithium/sulphur accumulator of claim 12, wherein the ether of the solvent comprises one of polyethylene glycol and dimethyl ether.

* * * * *